United States Patent
Ruscitto et al.

(10) Patent No.: US 8,345,789 B2
(45) Date of Patent: Jan. 1, 2013

(54) METHOD AND SYSTEMS FOR RECEIVING PLURAL INFORMATION FLOWS IN A MIMO SYSTEM

(75) Inventors: Alfredo Ruscitto, Turin (IT); Bruno Melis, Turin (IT); Loris Bollea, Turin (IT); Valeria D'Amico, Turin (IT); Maurizio Fodrini, Turin (IT)

(73) Assignees: Telecom Italia S.p.A., Milan (IT); Pirelli & C. S.p.A., Milan (IT)

( * ) Notice: Subject to any disclaimer, the term of this patent is extended or adjusted under 35 U.S.C. 154(b) by 115 days.

(21) Appl. No.: 12/809,497

(22) PCT Filed: Dec. 19, 2007

(86) PCT No.: PCT/EP2007/011141
§ 371 (c)(1),
(2), (4) Date: Oct. 4, 2010

(87) PCT Pub. No.: WO2009/080058
PCT Pub. Date: Jul. 2, 2009

(65) Prior Publication Data
US 2011/0019775 A1    Jan. 27, 2011

(51) Int. Cl.
*H04B 7/02* (2006.01)
*H04L 1/02* (2006.01)
(52) U.S. Cl. ........................... 375/267; 375/316
(58) Field of Classification Search ............ 375/267, 375/316
See application file for complete search history.

(56) References Cited

U.S. PATENT DOCUMENTS

2004/0224655 A1 * 11/2004 Petrov et al. ............... 455/226.1
2005/0025271 A1    2/2005 Molisch et al.
2005/0090205 A1    4/2005 Catreux-Erceg et al.
2005/0287962 A1    12/2005 Mehta et al.

FOREIGN PATENT DOCUMENTS

| EP | 1 475 904 A2 | 11/2004 |
| WO | WO-03/073645 A1 | 9/2003 |
| WO | WO-2006/052058 A2 | 5/2006 |
| WO | WO-2008/064696 A1 | 6/2008 |

OTHER PUBLICATIONS

Polydorou et al., Asymptotic Analysis of Hybrid Selection / Equal Gain Combining Diversity Receivers, Vehicular Technology Conference, vol. 3, pp. 1514-1518, (2005).
Heath et al., "Switching Between Diversity and Multiplexing in MIMO Systems", IEEE Transactions on Communications, vol. 53, pp. 962-968, (2005).
International Search Report from the Eruopean Patent Office for International Application No. PCT/EP2007/011141 (Mail date Oct. 9, 2008).

* cited by examiner

*Primary Examiner* — Shuwang Liu
*Assistant Examiner* — Nader Bolourchi
(74) *Attorney, Agent, or Firm* — Finnegan, Henderson, Farabow, Garrett & Dunner, L.L.P.

(57) ABSTRACT

In a communication system, such as a Multiple Input Multiple Output system operating in a spatial multiplexing mode, for use, e.g., in a WLAN or HSPDA device, a plurality of information flows are received via a set of receive antennas by deriving from at least some, and possibly all, of the receive antennas, respective RF signals, and producing from the RF signals thus derived, a plurality of receive signals, each receive signal to be demodulated to recover one of the information flows transmitted. The receive signals are produced as combinations of the RF signals having applied thereto relative RF phase shift weights.

14 Claims, 5 Drawing Sheets

*Fig. 9*

METHOD AND SYSTEMS FOR RECEIVING PLURAL INFORMATION FLOWS IN A MIMO SYSTEM

FIELD OF THE INVENTION

The invention relates to arrangements for receiving plural information flows. A possible field of use of such arrangements are so-called Multiple Input Multiple Output (MIMO) antenna systems.

DESCRIPTION OF THE RELATED ART

MIMO systems represent a promising solution for improving the capacity (throughput) and reliability (coverage range) of wireless communication systems.

In a MIMO system the transmitter is equipped with $n_T$ antennas and the receiver with $n_R$ antennas operating at the same time on the same frequency. A possible transmission mode of MIMO systems is the so-called spatial multiplexing (SM) technique based on the transmission of different data streams across the $n_T$ antennas with the goal of increasing the overall throughput. Recent information theory results have revealed that a richly scattered multi-path wireless channel is capable of providing a huge capacity. In the presence of MIMO-SM transmission mode, the multi-path environment can be exploited by transmitting simultaneously on the same frequency different data streams on different transmitting antennas providing a K-fold capacity increase, where K is the minimum between the number of transmitting antennas and the number of receiving antennas, i.e. $K=\min(n_T, n_R)$ with the constraint that $n_R \geq n_T$.

Figure 1:
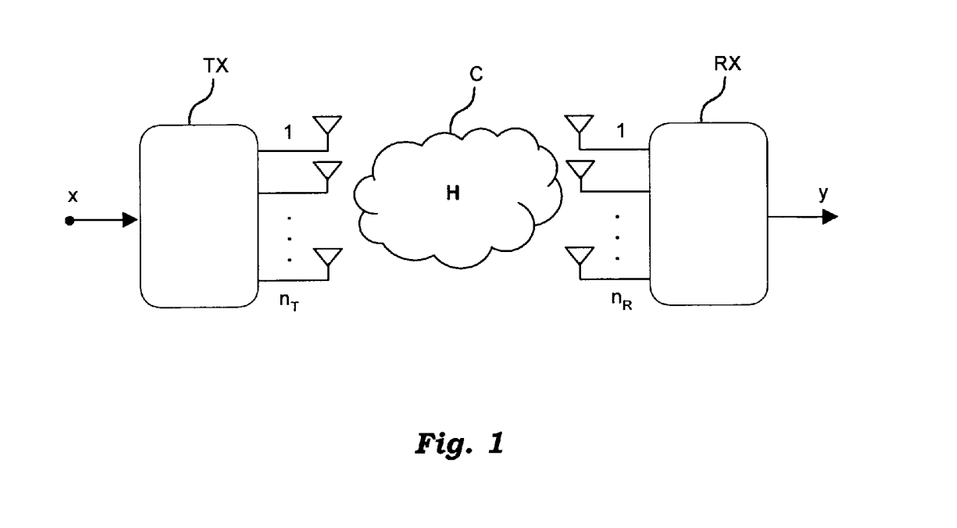

A block diagram of an exemplary MIMO system operating in a spatial multiplexing (SM) mode is shown in FIG. 1. There, a transmitter TX is shown which transmits a plurality of information flows towards a receiver RX over a channel C.

The transmitter TX can be thought of as a serial-to-parallel converter (S/P) or, equivalently, a time de-multiplexer. Supposing that every antenna is able to carry a data signal with a throughput equal to S, the overall throughput of the data signal x at the input of the MIMO transmitter TX is equal to $n_T \cdot S$, that is $n_T$ times larger than the throughput S carried by every single antenna. The spatial multiplexing effect across the multiple transmitting antennas introduced by the MIMO-SM transmitter leads to these data streams being mixed up in the air (i.e. in the "channel" C). If $n_R \geq n_T$ the output signal y can be recovered at the receiver RX by means of suitable signal processing algorithms. MIMO systems also offer a significant diversity advantage and thus they can improve the coverage range with respect to single antenna systems (SISO) by exploiting both transmit and receive antenna diversity.

The propagation channel C from the transmitter TX to the receiver RX can be modeled, for each multi-path component, by means of a channel matrix H of complex channel coefficients with size $n_R \times n_T$. The larger spectral efficiencies (high throughputs) that can be achieved with MIMO channels are based on the assumption that a rich scattering environment provides independent transmission paths from each transmit antenna to each receive antenna. Therefore, for single-user systems, a transmission and reception strategy that exploits this structure will achieve, with the minimum number of transmitting and receiving antennas $K=\min(n_T, n_R)$, a linear increase of the transmission rate for the same bandwidth with no additional power expenditure over a single antenna system. This capacity increase requires a scattering environment such that the channel matrix between transmit and receive antenna pairs has full rank and independent entries and that perfect estimates of its coefficients are available at the receiver. Performance of a MIMO system operating in a SM mode, in terms of throughput versus signal to noise plus interference (SINR) ratio, will thus depend on the properties of the channel matrix.

The exemplary SM technique considered here is based on digital signal processing operations that are performed by the receiver, at base-band level, and, in principle, is essentially independent of the electromagnetic characteristics of the receiving antennas (provided they have omni-directional radiation patterns). In the case in question, the number $n_R$ of receiving antennas is assumed to be larger or at most equal to the number $n_T$ of the transmitting antennas or equivalently the number of the transmitted spatial streams. In comparison to conventional MIMO receivers with $n_R = n_T$, those MIMO receivers having a number $n_R$ of receiving antennas higher than the number $n_T$ of multiple spatial streams provide a higher performance level, in terms of throughput versus signal to noise plus interference (SINR) ratio. This entails however a cost in terms of additional complexity due to the $n_R - n_T$ additional receivers and more complex base band (BB) algorithms.

WO-A-03/073645 describes a radio communications device comprising three or more diverse antennas and either a plurality of transmit chains or a plurality of receive chains, and wherein there are fewer transmit or receive chains than antennas. The radio communications device is arranged to provide multiple-input multiple-output (MIMO) communications with the advantage that increased data rates can be achieved in addition to cost and space reduction. The antennas employed can have directional radiation patterns with the further advantage of providing higher levels of signal-to-interference plus noise ratios (SINR) when employed in a cellular network. The radio communications device comprises a selector arranged to select for each receive chain or for each transmit chain any one of the antennas for use in conjunction with that receive or transmit chain as, for example, in a switched antenna selection scheme.

WO-A-06/052058 describes a method for enhancing performance of a MIMO system employing a space-time coding (STC) scheme, MIMO-STC, in conjunction with transmit antenna selection scheme. The transmitter includes N transmit antennas that are in excess of the M transmit antennas required for transmitting a signal to a space channel. The transmitter selects the M transmit antennas among the N transmit antennas and transmits a symbol by space-time encoding the symbol. The receiver includes M receive antennas for receiving a signal from the space channel so that it detects the transmitted information symbol by using the signal received through the receive antenna and subsequently generates a transmit antenna selection information for selecting M transmit antennas among N transmit antennas and returns the information to the transmitter.

TWO 2008/064696, discloses a wireless communication system wherein a sub-set of RF signals received from corresponding antenna elements is selected and combined into a single RF signal. The single RF signal is processed and demodulated in a single processing chain, which comprises a RF phasing network for co-phasing the selected RF signals before combining and a processor for controlling combining and phasing in order to obtain a single RF signal having a radio performance indicator which satisfies predetermined conditions.

OBJECT AND SUMMARY OF THE INVENTION

The Applicant has observed that the need exists for arrangements for use at the receiving side of e.g. a MIMO system with a number $n_R$ of receiving antennas larger than the number $n_T$ of transmitted spatial streams wherein only $n_T$ RF receivers are required, with a consequent reduction in terms of hardware complexity.

A specific object of the invention is to provide such arrangements which can be used advantageously e.g. in a Wireless LAN (WLAN) or HSDPA (High Speed Downlink Packet Access) context while being simple and thus easy and inexpensive to produce.

The object of the invention is to provide a response to that need.

According to the present invention, that object is achieved by means of a method having the features set forth in the claims that follow. The invention also relates to a corresponding system as well a Wireless Local Area Network (W-LAN) device comprising such a system.

The claims are an integral part of the disclosure of the invention provided herein.

An embodiment of the invention is thus a method of receiving via a set of receive antennas a plurality of information flows, the method including the steps of:

deriving from at least a subset of said set of receive antennas respective RF signals, and producing from said RF signals a plurality of receive signals, each said receive signal to be demodulated to recover one of said information flows, wherein said receive signals are produced as combinations of said RF signals having applied thereto relative phase shift weights.

In an embodiment, said respective RF signals are derived from all the receive antennas in the set.

In an embodiment, a MIMO receiver is provided which operates on the basis of the combination, at the RF level, of the signals received at the output of the $n_R$ antennas in order to generate $n_T$ RF signals at the input of the $n_T$ RF receivers.

Embodiments of the invention provide a performance level which is higher than that of a conventional MIMO receiver with $n_T$ omni-directional receive antennas while the extra complexity is limited to the additional number $n_R - n_T$ of antennas and to the RF combining unit.

An embodiment of the invention is suitable to be employed in the presence of a switched beam antenna architecture where the combination of the signals received at the output of particular directional antennas can provide benefits in terms of array gain, diversity and interference rejection.

An embodiment of the invention can be employed in wireless systems transmitting multiple spatial streams as for example Wireless LAN (WLAN) compliant with the standard IEEE 802.11n, Wireless MAN (WMAN) compliant with the standard IEEE 802.16e and the HSDPA-MIMO system proposed in 3GPP Release 7.

BRIEF DESCRIPTION OF THE ANNEXED DRAWINGS

The invention will now be described, by way of example only, with reference to the enclosed figures of drawing, wherein:

FIG. 1 has been already described in the foregoing,

DETAILED DESCRIPTION OF EXEMPLARY EMBODIMENTS

This detailed description presents an exemplary method and a related device for the implementation of a MIMO-SM receiver that, while including a number $n_R$ of receiving antennas larger than the number $n_T$ of transmitted spatial streams, may require only $n_T$ RF receivers with a consequent reduction in terms of hardware complexity. The exemplary architecture described herein may be based on the combination, at the RF level, of the signals received at the output of the $n_R$ antennas in order to generate $n_T$ RF signals at the input of the $n_T$ RF receivers.

The $n_R - n_T$ redundant antennas at the receiver may be used to collect different versions of the $n_T$ transmitted spatial streams that can be combined, at the RF level, with suitable weighting factors, in order to generate an equivalent channel matrix H with good properties for the transmission of multiple spatial streams.

The minimum Euclidean distance of the received constellation may be a good parameter for determining the performance of a MIMO system operating in SM mode. A description of the related theory is provided by R. W. Heath and A. J. Paulraj in: "Switching Between Diversity and Multiplexing in MIMO Systems" published on IEEE Transactions on Communications, Vol. 53, No. 6, June 2005.

In the following, an exemplary MIMO-SM system with two transmitting antennas and two receiving antennas will be considered, so that $n_R = n_T = 2$.

In this particular example the channel matrix H has the following expression $$H = \begin{pmatrix} h_{11} & h_{12} \\ h_{21} & h_{22} \end{pmatrix} \quad (1)$$

where the coefficients $h_{ij}$ with $i=1,2$ and $j=1,2$, in the case of omni-directional receiving antennas and a propagation scenario rich of scattering objects, are statistically independent complex zero mean Gaussian processes with an envelope having a Rayleigh probability density function and unitary variance. The minimum Euclidean distance of the codebook (or constellation) at the receiver (i.e. the codebook constructed when the channel operates on each codeword) may be a good performance indicator of a MIMO-SM system because, assuming maximum likelihood detection, the conditional error probability, given a channel realization, can be determined by the distance properties of the codebook at the receiver.

If $s = [s_1, s_2]^T$ denotes a codeword comprised of two QPSK symbols $s_1$ and $s_2$ respectively transmitted by the first and the second antenna of a 2×2 MIMO-SM system and $r = [r_1, r_2]^T$ denotes the corresponding codeword of symbols received respectively by the first and the second antenna, the following relationship applies:

$$\underline{r} = H \cdot \underline{s} + \underline{n} \quad (2)$$

where $\underline{n} = [n_1, n_2]^T$ is the contribution of the thermal noise samples $\bar{n}_1$ and $n_2$ at the input of the first and the second antenna, respectively. These noise samples can be assumed to be gaussian with zero mean and variance equal to $N_0$. For convenience every transmitted signal codeword is assumed here to be normalized in order to have unit energy $E_s$ so that $E_s = \|s_1\|^2 + \|s_2\|^2 = 1$ and the channel H is assumed to be perfectly known at the receiver (via training symbols).

The following description will refer to a MIMO decoder based on a maximum likelihood (ML) algorithm and performance of the MIMO-SM system will be assumed to be indicated by the raw Bit Error Rate (BER) as a function of the signal-to-noise plus interference ratio (SINR) at each receiving antenna. Those skilled in the art will appreciate that any other MIMO decoder, such as e.g. a MIMO decoder based on maximum-a-posteriori algorithm, or any other performance indicator may be used.

The paper by R. W. Heath and A. J. Paulraj already cited in the foregoing shows that the error probability on the received codeword r conditioned to a particular channel realization H, denoted as P(error/H), is upper bounded by the following expression $$P(\text{error}/H) \le (2^M - 1) \text{erfc}\left(\frac{E_S}{2N_0} d_{min,r}^2(H)\right) \quad (3)$$

where M is the overall number of bits carried by the MIMO-SM system for each possible transmitted codeword (e.g. with M equal to 4 for a system with $n_T = 2$ and a QPSK modulation) and $d_{min,r}^2(H)$ is the squared minimum Euclidean distance of the received codebook. In the particular case of QPSK modulation and $n_R = n_T = 2$ transmitting and receiving antennas the squared minimum Euclidean distance of the received codebook $d_{min,r}^2(H)$ conditioned to the channel matrix H can be computed as detailed in the following.

If one considers two transmitted codewords $\underline{s}_i$ and $\underline{s}_j$ such that $\underline{s}_i \ne \underline{s}_j$. The squared Euclidean distance between two possible transmitted codewords $\underline{s}_i$ and $\underline{s}_j$ at the receiver is given by $$\|H \cdot (\underline{s}_i - \underline{s}_j)\|^2$$

The minimum squared Euclidean distance at the receiver can be found by minimizing this difference over all possible codewords and can be expressed as $$d_{min,r}^2(H) = \min_{\substack{i,j \\ i \ne j}} \|(\underline{r}_i - \underline{r}_j)\|^2 = \min_{\substack{i,j \\ i \ne j}} \|H \cdot (\underline{s}_i - \underline{s}_j)\|^2 \quad (4)$$

The impact of the minimum Euclidean distance $d_{min,r}^2(H)$ of the codebook (or constellation) at the receiver on the performance of a MIMO-SM system in terms of raw BER as a function of the signal to interference plus noise ratio (SINR) measured at each receiving antenna can be evaluated on the basis of the following conditional probabilities:

Raw $BER_1 = P\{error | 0.0 < d_{min,r}^2(H) \le 0.5\}$

Raw $BER_2 = P\{error | 0.5 < d_{min,r}^2(H) \le 1.0\}$

Raw $BER_3 = P\{error | 1.0 < d_{min,r}^2(H) \le 1.5\}$

Raw $BER_4 = P\{error | 1.5 < d_{min,r}^2(H) \le 2.0\}$

Raw $BER_5 = P\{error | 2.0 < d_{min,r}^2(H) \le 2.5\}$

These can be obtained by conditioning the Raw BER to different values of the minimum squared Euclidean distance $d_{min,r}^2(H)$ quantized over five different intervals derived from the corresponding probability density function. For higher values of the parameter $d_{min,r}^2(H)$, performance in terms of raw BER exhibits a significant gain in terms of SINR with respect to the corresponding curves obtained for smaller values of $d_{min,r}^2(H)$.

The minimum Euclidean distance $d_{min,r}^2(H)$ can be calculated at the receiver by exploiting the knowledge of channel matrix H, which is estimated by means of reference sequences. The computation of equation (4) may however require a search over a large number of transmitted codewords, which may be prohibitive for large constellations such as 16 QAM or 64 QAM. Measuring the parameter $d_{min,r}^2(H)$ at the receiver may thus turn out to be overly complex.

It is thus possible to derive an indication about the minimum squared Euclidean distance of the constellation received from the corresponding value of Raw BER measured by the baseband (BB) modules of a MIMO receiver. Moreover, by exploiting the one-to-one relationship between one particular value of the raw BER and the corresponding value of the BER decoded at the output of the channel decoder or, alternatively, the corresponding value of packet error rate (PER), it is possible to derive an indirect measure of the minimum squared Euclidean distance through the corresponding value of PER averaged over a certain number of received packets. The lower the value of PER, the higher the corresponding value of minimum squared Euclidean distance.

Measuring MIMO receiver performance in terms of PER involves the reception of several packets and may be slower than a corresponding measurement of the minimum squared Euclidean distance (which in principle can be performed instantaneously on every packet received). Moreover, the measure of PER can be performed with a negligible complexity with respect to the measure of minimum squared Euclidean distance that, on the contrary, may impact on system complexity. The throughput (T) that a MIMO receiver can achieve is directly related to the PER according to the following relationship $$T = T_{peak} \cdot (1 - PER)$$

where $T_{peak}$ is the peak throughput achievable in the absence of errors in the received data stream. Consequently, it may also be possible to measure MIMO receiver performance in terms of the throughput (T) achievable in a particular propagation scenario. Moreover, MIMO wireless systems usually support adaptive modulation and coding techniques that adaptively change the employed modulation and coding scheme. A higher signal-to-interference-plus-noise ratio (SINR) at the receiver will translate into a higher product of the modulation order and the channel encoding rate employed and, consequently, the maximum achievable throughput $T_{peak}$ will be higher.

If one defines the transmission mode (TM) employed as the set of parameters, including modulation order and channel encoding rate, which determines the maximum achievable throughput $T_{peak}$, an alternative way for measuring the performance of a MIMO receiver may be via the transmission mode (TM) employed in a particular propagation scenario.

For a IEEE 802.11 WLAN system, the transmission mode may correspond to a particular transmission scheme, characterized by a particular modulation scheme (QPSK, 16 QAM, 64 QAM for example) and channel encoding rate (1/2, 3/4, 5/6 for example) that determine the maximum data rate at the output of PHY layer (6, 12, 18, 24, 54 Mbps for example). New transmission modes have been introduced for a MIMO-WLAN system compliant with the standard IEEE 802.11n. Similarly, for a UMTS system the transmission mode may correspond to a particular value for the transport format (TF) that determines the maximum data rate at the output of PHY layer (e.g. 12.2, 64, 128, 384 kbps) while for a HSPDA system the transmission mode may correspond to a particular value of the channel quality indicator (CQI) that determines the maximum data rate at the output of PHY layer (e.g. 325, 631, 871, 1291, 1800 kbps).

The quality of a MIMO-SM radio link perceived by a MIMO receiver can be reasonably measured by means of a quality function Q, that depends on some physical (PHY) and MAC layer parameters such as received signal strength indicator (RSSI), Packet Error Rate (PER), MAC throughput (T) and employed transmission mode (TM), i.e.:

$$Q_s = f(RSSI, PER, T, TM)$$

Usually, the higher the value of $Q_s$, the higher the quality of the received signal at application level. Those skilled in the art will appreciate that other quality indicators as indicated in the foregoing may be used to calculate an alternative quality function.

The function $Q_s$ may thus be used as a Radio Performance Indicator (RPI) to select the beams (i.e. the RF channels) and the RF phase shift weights to be applied. Other types of Radio Performance Indicators (RPI) may be used within the framework of the arrangement described herein. It will however be appreciated that, while being representative of the quality of the respective RF signal, such radio performance indicators as e.g. the Received Signal Strength Indicator (RSSI), Packet Error Rate (PER), Signal to Interference-plus-Noise ratio (SINR), MAC throughput (T) and employed transmission mode (TM), or any combination of the aforementioned performance indicators will be non-RF, i.e. Intermediate Frequency (IF) or BaseBand (BB) indicators.

Figure 2:
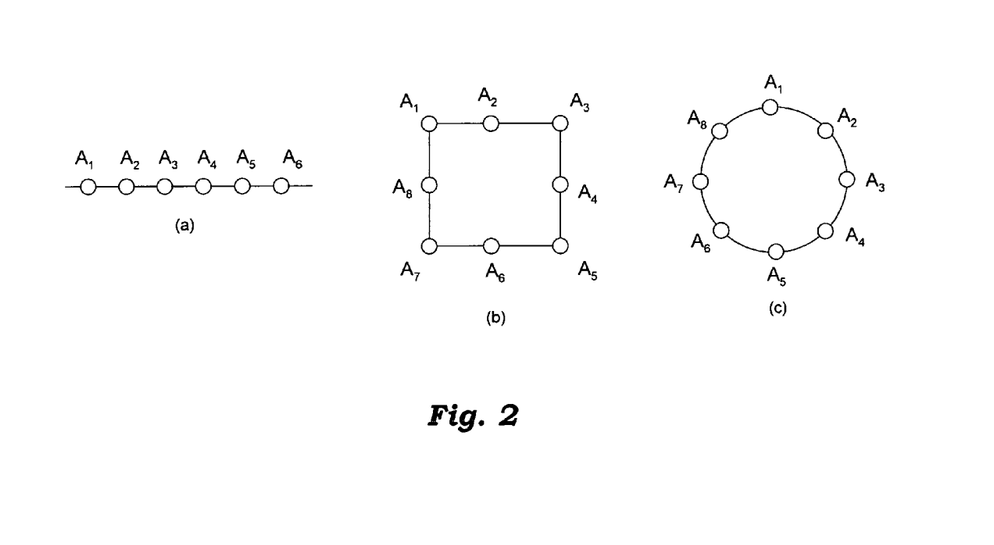
FIGS. 2*a* to 2*c* show exemplary antenna configurations.

FIGS. 2a to 2c show some exemplary antenna configurations including a number of receive antennas $n_R$ which will be assumed to be larger than the number $n_T$ of transmitted spatial streams (i.e. information flows). In the following, the RF signals received at the output of the $n_R$ antennas will be denoted as $r_i$ where $i=1, 2, \ldots, n_R$.

Specifically, in FIG. 2a six antennas $A_1, A_2, \ldots, A_6$ are arranged on a line. In FIGS. 2b and 2c, eight antennas $A_1, A_2, \ldots, A_8$ are placed equidistantly on the perimeter of a square (FIG. 2b) and the perimeter of a circle (FIG. 2c).

For instance, an exemplary case can be considered where the number of transmitted spatial streams $n_T$ is equal to 2 (two) and the number of receiving antennas $n_R$ is equal to 8 (eight).

In a receiving apparatus the number of RF receivers may be equal to the number of receiving antennas $n_R$ so that the base band (BB) processing unit has, as input, $n_R$ digital signals that can be exploited for improving the system performance in terms of coverage and throughput. In this case, an equivalent channel matrix H can be defined as $$H = \begin{pmatrix} h_{11} & h_{12} \\ h_{21} & h_{22} \\ h_{31} & h_{32} \\ h_{41} & h_{42} \\ h_{51} & h_{52} \\ \ldots \\ h_{n_R 1} & h_{n_R 2} \end{pmatrix}$$

so that the BB receiver may be a Maximum Likelihood (ML) receiver computing, with the knowledge of the signals $r=[r_1, r_2, \ldots r_{n_R}]^T$ received in correspondence of the transmitted unknown symbols $s=[s_1, s_2]^T$, the following metrics.

$$d^2(\underline{r}, s_{i,j}) = \|(\underline{r} - H \cdot s_{i,j})\|^2 \quad (5)$$

where $s_{i,j} = [s_i, s_j]^T$ is a particular codeword of the transmitted Codebook.

This first technique for exploiting the $n_R - n_T$ redundant antennas may require a number of RF receivers or transceivers equal to the number $n_R$ of receiving antennas with a consequent impact on the hardware complexity of the receiver at both BB and RF level.

In order to exploit the $n_R - n_T$ redundant antennas, the receiver may select a set of $n_T$ signals $\{A_i, A_j, \ldots A_k\}$ obtained at the output of $n_T$ receiving antennas and feeding the input of the $n_T$ RF receivers with the corresponding RF signals.

For exemplary purposes, one may consider the case of $n_R=8$ and $n_T=2$. In that case, an exemplary criterion for the selection of the pair $(A_i, A_j)$ of receiving antennas may involve selecting the two antennas $(A_i, A_j)$ with the highest values of received signal strength indicator (RSSI) measured by the BB processing unit. In particular, feedback signals generated by the BB processing unit may be used to control the antenna selection unit during the measurement of the RSSI from every particular beam.

A second possible criterion may involve selecting the two antennas $(A_i, A_j)$ that provide an equivalent channel matrix H $$H = \begin{pmatrix} h_{i1} & h_{i2} \\ h_{j1} & h_{j2} \end{pmatrix}$$

with the largest squared Euclidean distance or, alternatively, with the highest value of quality function $Q_s$ in terms of throughput (T) or transmission mode (TM).

In the following, this technique will be referred to generally as MIMO-SM with antenna selection, independently from the particular criterion employed for the selection of the antenna pair $(A_i, A_j)$.

An approach for exploiting the $n_R - n_T$ redundant antennas at the receiver may be based on the generation of $n_T$ signals $z=[z_1, z_2, \ldots z_{n_T}]^T$ by linear multiplying the vector $r=[r_1, r_2, \ldots r_{n_R}]^T$ of $n_R$ received signals for a combining matrix W with $n_T$ lines and $n_R$ columns $$W = \begin{bmatrix} w_{1,1} & w_{1,2} & w_{1,3} & \ldots & w_{1,n_R} \\ w_{2,1} & w_{2,2} & w_{2,3} & \ldots & w_{2,n_R} \\ & & & & \\ w_{n_T,1} & w_{n_T,2} & w_{n_T,3} & \ldots & w_{n_T,n_R} \end{bmatrix} \quad (6)$$

so that $$z = W \cdot r$$

In the exemplary case, where the number of transmitted spatial streams $n_T$ is equal to 2 and the number of receiving antennas $n_R$ is equal to 8, the matrix W has 2 lines and 8 columns.

Figure 3:
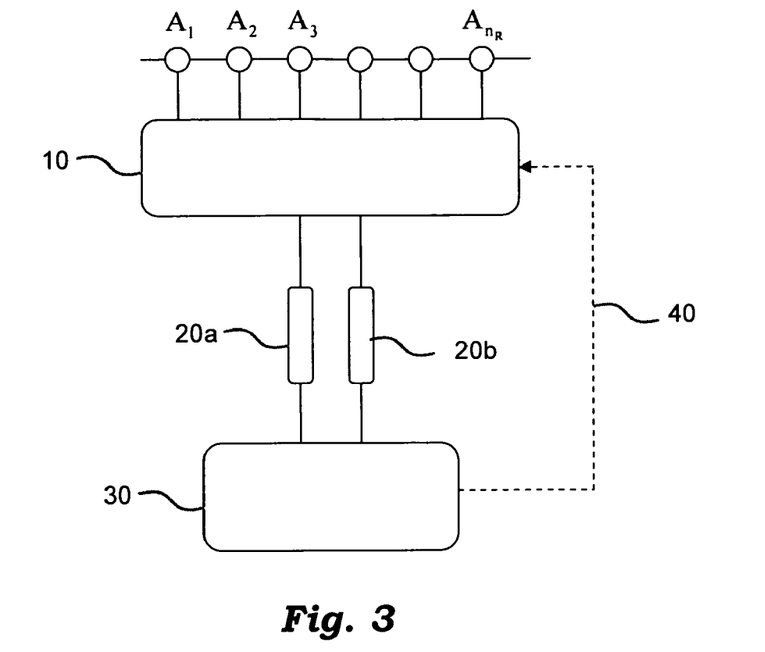
FIG. 3 is a schematic representation of a switched beam antenna system.

An embodiment of a possible switched beam antenna system is shown in FIG. 3. Specifically, a number of $n_R$ antennas $A_1, A_2, \ldots A_{n_R}$ are connected to a phasing and combining network 10, which is in turn connected to two RF receivers 20a and 20b. A BB processing unit 30 is then able to generate feedback signals 40 for controlling the network 10, to perform an analysis of the signals currently received from the RF receivers 20a and 20b, and to select the most suitable antennas. Those skilled in the art will appreciate that also a dedicated control unit may be used in order to avoid modifications of the BB processing unit 30. Such a control unit may e.g. read the measurements provided by the BB processing unit 30 and control the feedback signals 40.

Generally, the received signals $\underline{r}=[r_1, r_2, \ldots r_{n_R}]^T$ can be written as:

$$\underline{r} = H \cdot \underline{s} + \underline{n} \quad (7)$$

where $\underline{n}=[n_1, n_2, \ldots n_{n_R}]^T$ is the vector of noise and interference samples at the input of every receiving antenna with components $n_i$ with $i=1,2, \ldots n_R$ that are supposed to be spatially white complex gaussian random variables with zero mean and variance equal to $N_0$. By combining equation (7) and (6) follows that $$\underline{z} = W \cdot H \cdot \underline{s} + W \cdot \underline{n} = G \cdot \underline{s} + \underline{m} \quad (8)$$

where G is a matrix with $n_T$ lines and $n_T$ columns given by the product of the combining matrix W and the channel matrix H and $\underline{m}=[m_1, m_2, \ldots m_{n_R}]^T$ is the vector obtained by multiplying the vector of noise and interference samples n for the combining matrix W. Given a certain channel matrix H the basic idea consists in selecting the combining matrix W in order to obtain an equivalent channel matrix G with good properties in terms of minimum Euclidean distance of the received codebook $d_{min,r}^2(G)$ or alternatively with higher value of quality function Q, in terms of throughput (T) or transmission mode (TM).

Moreover, when adopting this approach, by introducing some constraints on the values of the coefficients of the combining matrix W, the computation of the $n_T$ signals $\underline{z}=[z_1, z_2, \ldots z_{n_T}]^T$ can be directly performed at the RF level with consequent savings in terms of hardware complexity; in this particular case, the number of required RF receivers is only equal to $n_T$.

Figure 4:
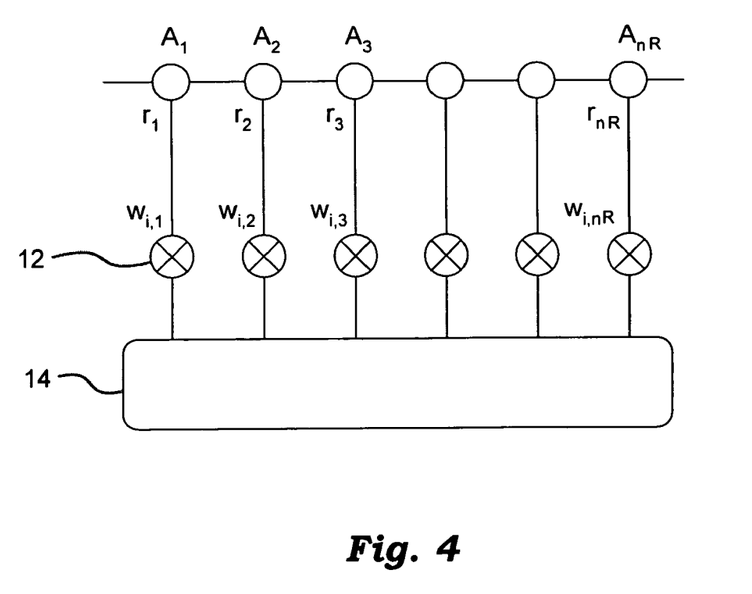
FIG. 4 is a schematic representation of a RF phasing circuit.

Assuming that every coefficient $w_{i,j}$ with $j=1,2, \ldots n_R$ and $i=1,2, \ldots n_T$ of W has unitary module and phase equal to $\phi_{i,j}$ the product of the vector $\underline{r}=[r_1, r_2, \ldots r_{n_R}]^T$ by a particular line $\underline{w}_i = [w_{i,1}, w_{i,2}, w_{i,3} \ldots w_{i,n_R}]^T$ of the matrix W may be implemented by means the circuit shown in FIG. 4.

Specifically, such a circuit may include a set of RF phasing networks 12, which are connected to the respective antennas $A_1, A_2, \ldots A_{nR}$ and to a common combiner 14.

In the exemplary case, the phasing and combining network 10 of FIG. 3 could be implemented by two of these circuits, which would then provide the signals to the RF receivers 20a and 20b.

A further simplification of the RF phasing network of FIG. 4 can be obtained by assuming that the phase $\phi_{i,j}$ of the weighting coefficient $w_{i,j}$ can assume only particular quantized values.

Figure 5:
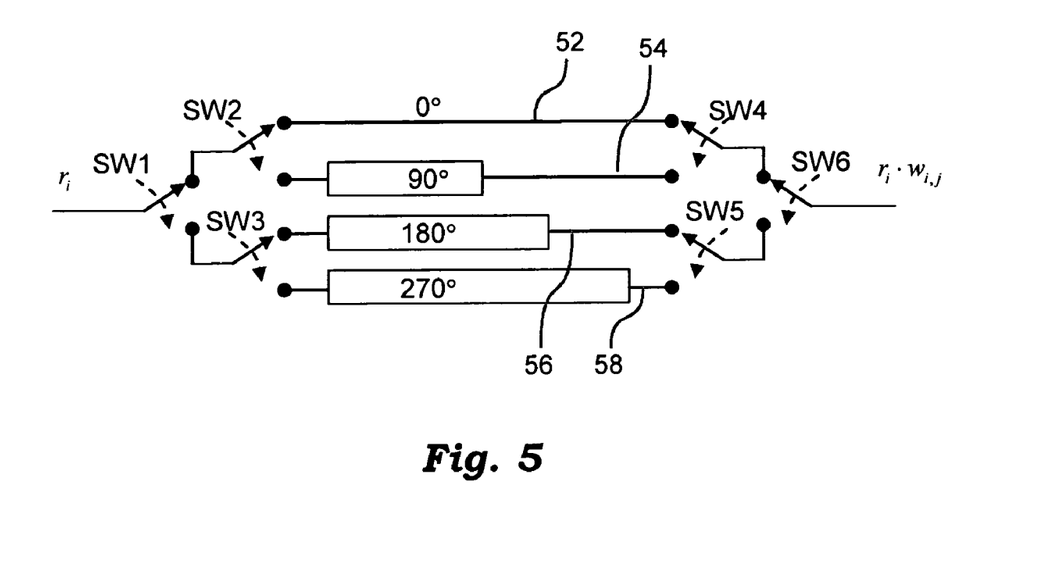
FIGS. 5 and 6 are further schematic representations of RF phasing circuits.

Assuming that the phase $\phi_{i,j}$ of the coefficient $w_{i,j}$ can take values in the set $\{0, \pi/2, \pi, 3/2\pi\}$, the corresponding multiplication of the received signal $r_i$ for the coefficient $w_{i,i}$ can be obtained by means of the circuit shown in FIG. 5, including a number of RF delay lines 52, 54, 56, 58 with different lengths.

It will be appreciated that, for the purposes of this description, a unitary real coefficient $w_{i,j}$ with $\phi_{i,j}$ equal to zero will in any case be considered as a particular case for a phase shift weight.

In a corresponding embodiment as shown in FIG. 5, the "delay" line 52 will thus be a line avoiding (i.e. exempt of) any phase shift, while the delay lines 54, 56 and 58 generate phase shifts of 90°, 180° and 270°, respectively.

An arrangement including six RF switches $SW_1, SW_2, \ldots SW_6$ will permit, by adequately setting the switches, to selectively obtain any one of the four values of phase shift in the set $\{0, \pi/2, \pi, 3/2\pi\}$.

The exemplary processing arrangement just described thus includes at least one RF delay line 54 to 58 to apply a phase shift weight (W) to a respective RF signal $r_1, \ldots, r_{nR}$ derived from the receive antennas. In the embodiment shown, the processing arrangement thus includes at least two propagation paths 52 to 58 for the RF signal $r_1, \ldots, r_{nR}$. At least one of these propagation paths 52 to 58 includes a said delay line (this is the case for the paths 54 to 58) with a different delay value. The switching elements SW1 to SW6 are operable to selectively direct the respective RF signal $r_1, \ldots, r_{nR}$ to the propagation paths 52 to 58 in order implement a different phase shift weight. One of the propagation paths, namely the path indicated by reference numeral 52 is exempt of any delay line (i.e. implements a phase shift weight equal to zero).

Implementing RF delay lines providing a specified phase shift and RF switches for selective connection thereof is well known in the art, which makes it unnecessary to provide a more detailed description herein.

The RF multiplier circuits of FIG. 4 can be simplified by assuming that the phase $\phi_{i,j}$ of the weighting coefficient $w_{i,j}$ can assume only two particular quantized values in the set $\{0, \pi\}$. The corresponding multiplication of the received signal $r_i$ for the coefficient $w_{i,j}$ can thus be obtained by means of the circuit shown in FIG. 6.

Figure 6:
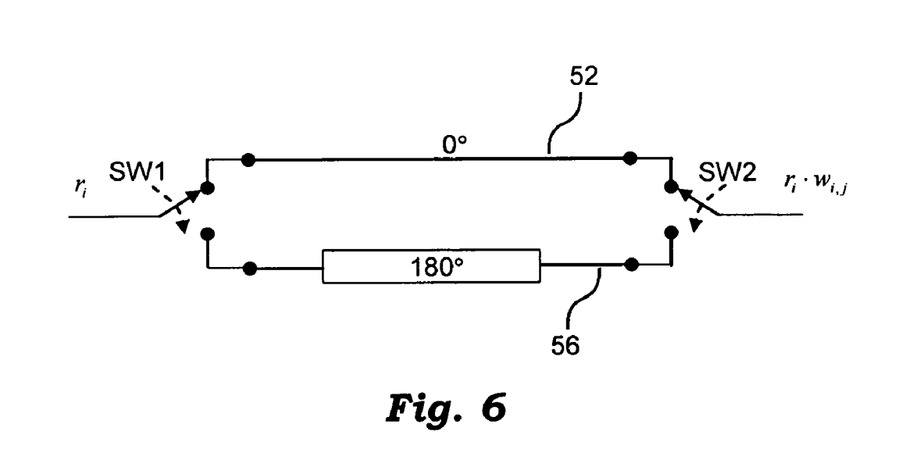

Specifically, in this arrangement only the delay lines 52 (with no phase shift proper) and 56 and two switches $SW_1$ and $SW_2$ are required to obtain the RF multiplication.

A simplification of the overall receiver architecture can be obtained by supposing that, in every line of the combining matrix W, only $n_T-1$ coefficients $w_{i,j}$ have unitary module and phase $\phi_{i,j}$ quantized e.g. over 4 or 2 different values, one coefficient is equal to 1, and the remaining $n_R-n_T$ coefficients are equal to zero.

In this particular case an additional constraint may be introduced by requiring that, in every column of the combining matrix W only one coefficient $w_{i,j}$ with $j=1,2, \ldots, n_R$ has a module equal to 1. This means that each one of the $n_R$ signals received contributes only once to the combination.

For example, the combining matrix W may have the following structure $$W = \begin{bmatrix} 0, & 0, & 0, & w_{1,A}, & 0, & 0, & w_{1,B}, & 0 \\ 0, & w_{2,C}, & 0, & 0, & 0, & w_{2,D}, & 0, & 0 \end{bmatrix}$$

with the following conditions for the four coefficients different from zero:

$w_{1,A}=1$ $w_{2,C}=1$ $w_{1,B}=w_1=\exp(j\phi_1)$ with $\phi_1 \in \{0, \pi\}$ or $\phi_1 \in \{0, \pi/2, \pi, 3/2\pi\}$ $w_{2,D}=w_2=\exp(j\phi_2)$ with $\phi_2 \in \{0, \pi\}$ or $\phi_2 \in \{0, \pi/2, \pi, 3/2\pi\}$ Specifically, the positions of the coefficients $w_{1,A}$ and $w_{1,B}$ in the first line of the combining matrix W determine, among the $n_R=8$ signals $\underline{r}=[r_1, r_2, \ldots r_{n_R}]^T$ received from the antennas $A_1, A_2, \ldots A_8$, those signals $r_A$ and $r_B$ that are combined through the RF multiplication for the weighting coefficient $w_{1,B}$ in the following denoted as $w_1$.

In a similar way the position of the coefficients $w_{2,C}$ and $w_{2,D}$ in the second line of the combining matrix W determines the signals $r_C$ and $r_D$ that are combined through the RF multiplication for the weighting coefficient $W_{2,D}$ in the following denoted as $w_2$.

Finally, the constraint requiring that in every column of the combining matrix W is only one coefficient $w_{i,j}$ with $j=1,2,\ldots,n_R$ that has a module equal to 1, corresponds to combining, at RF level, two RF signals $r_A$ and $r_B$, whose weighted sum feeds the first RF receiver, that are different from the corresponding two RF signals $r_C$ and $r_D$ that are combined at RF level and whose weighted sum feeds the second RF receiver.

Figure 7:
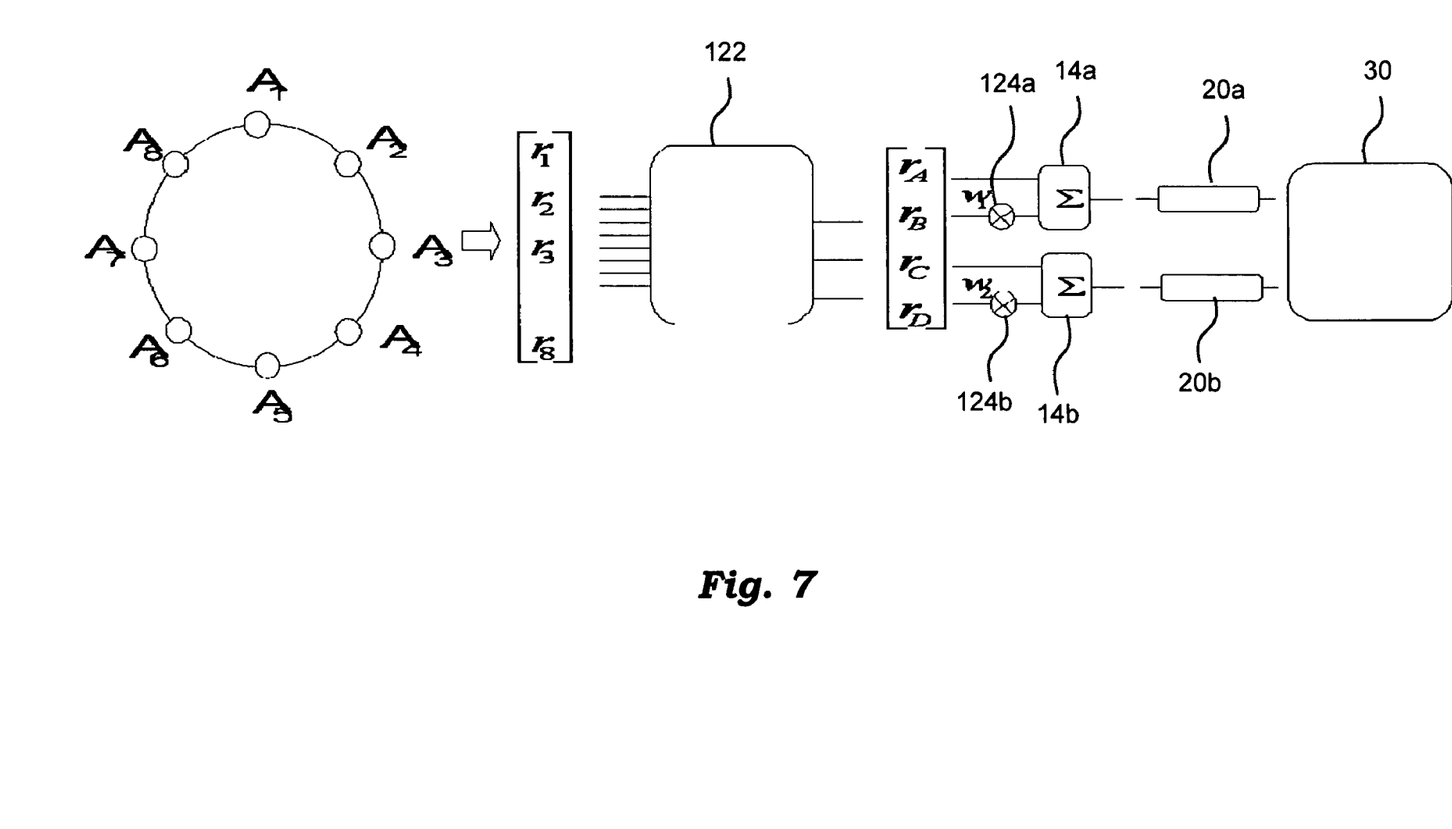
FIGS. 7 and 8 are schematic representations of switched beam antenna systems.

FIG. 7 shows schematically a possible embodiment of a switched beam antenna system for the exemplary case of $n_R=8$ and $n_T=2$. Specifically, the signals $r=[r_1, r_2, \ldots r_{n_R}]^T$ received from the antennas $A_1, A_2, \ldots A_8$ are connected to a switching network 122, which provides the signals $r_A, r_B, r_C$ and $r_D$. The switching network 122 may be set e.g. through the BB processing circuit 30, which analyses the quality function $Q_s$ and provides the information about the signals $r_A, r_B, r_C$ and $r_D$ which are selected.

The signals $r_A$ and $r_B$ are then processed by multiplying them by the respective coefficients of the matrix W, to be then combined in a combiner 14a and provided to the first RF processing chain 20a. Specifically, no multiplication is necessary for the signal $r_A$, because the coefficient $w_{1,A}$ is equal to 1. Instead the signal $r_B$ is multiplied with the coefficient $w_1$ (i.e. $w_{1,B}$) by a first RF phasing network 124a.

Similarly, only the signal $r_D$ may be multiplied with the coefficient $w_2$ (i.e. $w_{2,D}$) by a second RF phasing network 124b, and the weighted signals are combined in a combiner 14b and provided to the second RF processing chain 20b.

Applicants verified that this condition ensures that the equivalent channel matrix G has good properties in terms of minimum Euclidean distance of the received codebook and consequently also in terms of in terms of throughput (T).

The operations performed by the MIMO wireless receiver or transceiver with redundant antennas shown in FIG. 7 are therefore the following:
  determine, among the $n_R=8$ received signals, the 4 signals $r_A, r_B, r_C$ and $r_D$ according to a first criteria, and
  determine the values of the phases of the 2 weighting coefficients $w_1$ and $w_2$ according to a second criteria.

The final goal is to maximize a certain quality function $Q_s$ that can be measured by the receiver in terms, for example, of received signal strength indicator (RSSI), Packet Error Rate (PER), MAC throughput (T) and employed transmission mode (TM) or in terms of a suitable combination of the aforementioned performance indicators so that the first criteria for the selection of the signals $r_A, r_B, r_C$, and $r_D$ together with the second criteria for the selection of the weighting coefficients $w_1$ and $w_2$ should be chosen with the goal of maximizing a quality function $Q_s$.

Exemplary embodiments of criteria for the selection of the signals $r_A, r_B, r_C$, and $r_D$ are provided in the following. In the particular case of propagation scenarios without interference from the neighboring cells, where thermal noise is the main limiting factor, it is possible to select the four signals $r_A, r_B, r_C$ and $r_D$ with the higher values of received signal strength indicator (RSSI) measured by the BB processing unit 30.

On the contrary, for propagation scenarios with a high level of interference it is possible to select the 4 signals $r_A, r_B, r_C$ and $r_D$ with the highest value of signal-to-noise plus interference ratio (SINR) measured by the BB processing unit 30. The signal-to-noise plus interference ratio (SINR) can be measured, for example, as difference of subsequent measures of RSSI obtained first on the useful transmitter and then on the interfering transmitter. This approach is not very precise when the transmissions of the reference beacon channels of the useful and of the interfering transmitters present a certain overlap in time.

Alternatively, it is possible to select the four signals $r_A, r_B, r_C$ and $r_D$ providing the higher values of throughput (T) measured by the BB processing unit 30.

After having selected the four signals $r_A, r_B, r_C$ and $r_D$ it is possible to optimize the values of the coefficients $w_1$ and $w_2$ through an exhaustive search driven by a certain performance indicator provided by the BB processing unit 30 such as the throughput (T) of the radio link.

In case of coefficients $w_1$ and $w_2$ quantized over two different values four different values of the aforementioned performance indicators are computed, while, in the case of coefficients quantized over four different values, sixteen different values of the performance indicator are computed and the coefficients $w_1$ and $w_2$ providing the highest value of the performance indicator are selected.

Another exemplary approach involves selecting the four signals $r_A, r_B, r_C$ and $r_D$ jointly with the four or sixteen 16 values of the coefficients $w_1$ and $w_2$ through an exhaustive search driven by a certain performance indicator provided by the BB processing unit 30, such as the throughput (T) of the radio link. This approach may require a longer computational time but provides the optimal combination of the signals received and the weights that maximize the performance indicator considered.

In the particular case where the number of transmitted spatial streams $n_T$ is equal to two and the number of receiving antennas $n_R$ is equal to eight, the overall number of combination of the signals $r_A, r_B, r_C$ and $r_D$ with the values of the coefficients $w_1$ and $w_2$ is equal to 6720 for coefficients $w_1$ and $w_2$ quantized over 2 values and to 26880 for coefficients $w_1$ and $w_2$ quantized over 4 values. Under these assumptions an exhaustive search may not be feasible for most applications.

Possible simplifications of the switching network 122 for selecting the signals $r_A, r_B, r_C$ and $r_D$ can be envisaged in order to reduce the time for performing the exhaustive search.

Figure 8:
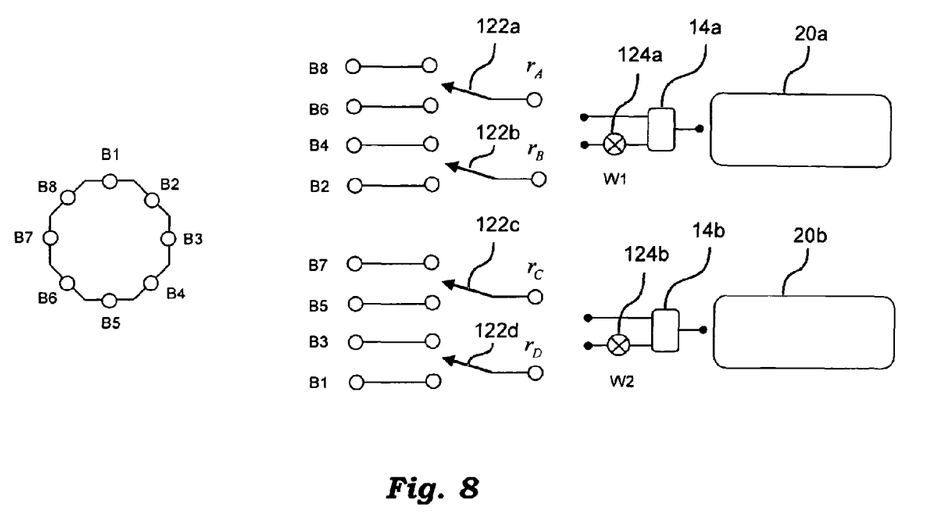

In FIG. 8 shows an exemplary simplified switching network where only some particular combinations of the signals received by the different beams can be provided to the two RF processing chains 20a and 20b.

Specifically, the switching network 122 of FIG. 7 may be implemented e.g. by means of four switches. A first switch 122a may select the signal $r_A$ among the signals provided from the antennas $B_6$ and $B_8$. Similarly the switches 122b, 122c, 122d may select the signal $r_B, r_C$ and $r_D$ among the signals provided from the antennas $B_2$ and $B_4$, $B_5$ and $B_7$, and $B_1$ and $B_3$, respectively.

In the exemplary implementation of the switching network shown in FIG. 8, the overall number of combination of the signals $r_A, r_B, r_C$ and $r_D$ with the values of the coefficients $w_1$ and $w_2$ is equal to 64 for coefficients $w_1$ and $w_2$ quantized over 2 values and to 256 for coefficients $w_1$ and $w_2$ quantized over 4 values so that the search procedure is greatly simplified at the cost of a slight reduction of the system performance due to non exhaustive search procedure of the received signals.

The technique proposed for the reception of multiple spatial streams with redundant antennas can be employed in the presence of receiving antennas with omni-directional radiation patterns or alternatively in the presence of directional antennas with the further advantage of introducing a beneficial effect of spatial filtering (through the selection of four out of eight directional receiving antennas) that can increase system performance in the presence of a propagation scenario limited by interferers that are not spatially white.

The most common antenna types for WLANs have omni-directional radiation patterns. Omni-directional antennas propagate RF signals in all directions equally on a horizontal plane (azimuth plane). The gain achieved with an omni-directional antenna can somehow not be sufficient to reach certain coverage ranges. Higher gain values can be obtained when adopting a directional antenna, which is able to focus the transmitted and received RF energy in a particular direction thus achieving higher coverage ranges.

Moreover, in order to achieve an improvement both in terms of coverage and throughput, the spatial domain of the propagation environment can be exploited by adopting multiple antennas. Such systems increase the information available at the receiver end by means of appropriate signal processing techniques, thus reducing the impairments such as multi-path interference introduced during the transmission over the propagation channel. The exploitation of multiple directional antennas can lead to good performance in terms of throughput and coverage range.

In the particular case of directional antennas, the design of the antenna system has to take into account that the received signals arrive from all possible directions. In particular the Angle of Arrival (AoA) in the azimuth plane may take all the possible values between 0 and 360 degrees due to the presence of many scattering objects surrounding the receiver.

The AoA distribution in the elevation plane depends on the transmitter position. The transmitters are generally placed in the centre of the room or fixed to a wall or to the ceiling in order to provide maximum coverage. It is then reasonable to assume the AoA in the elevation plane is concentrated around the horizontal direction with an angular spread lower than 180 degrees.

Figure 9:
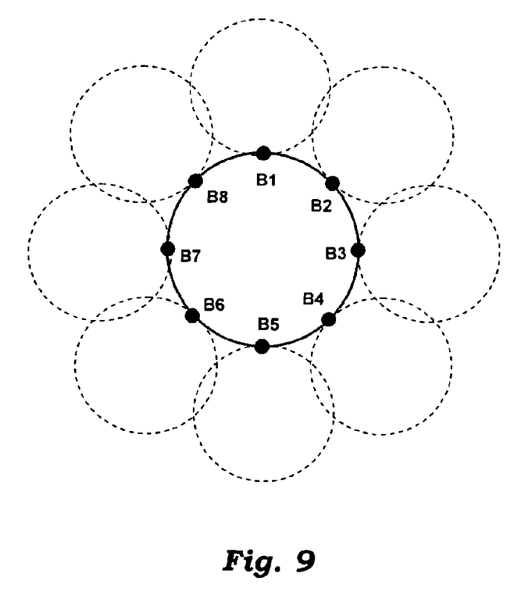
FIG. 9 shows an exemplary antenna arrangement with directional antennas.

The top view of a possible multiple directional antenna system is shown in FIG. 9 in the particular case of N=8 directional antennas $B_1, B_2, \ldots B_8$ (placed on the vertexes of a regular octagon circumscribed by a circumference).

Experimental results have been obtained by the Applicant, i.a. with reference to three different receiver architectures, namely:
- MIMO 2×2: the basic reference system, equipped with 2 omni-directional antennas that feed 2 RF receivers at the receiver end,
- MIMO 2×8 with selection of 2 directional antennas, where the receiver selects (among the 8 available receiving antennas) a suitable pair of antennas and feeds their signals to the input of 2 RF receivers. The selection of the 2 antennas is carried out by referring to the two highest Received Signal Strength Indicator (RSSI) values, and
- MIMO 2×8 with RF combination of 4 directional antennas, where the receiver selects (among the 8 available receiving antennas) two pairs of signals feeding the input of the 2 RF receivers. The 4 signals are selected as follows. First the selection of 4 antennas is carried on by determining, among the 8 signals received by the available antennas, the 4 signals that maximize a certain performance indicator (e.g. RSSI in a noise-limited scenario, SINR in an interference-limited scenario). Subsequently the receiver determines the appropriate phase values of the 2 weighting coefficients that maximize the same performance indicator value for the combined signals. The architecture is shown in FIG. 8.

Four different propagation scenarios were used to evaluate system performance. These four scenarios refer to different propagation environments that are all characterized by the presence of a transmitter (TX) position and a receiver (RX) position, by two separate clusters of scatterers. All the scenarios had the same Angle of Arrival (AoA) and Angle of Departure (AoD) values but have different Angle Spread (AS) values. The angle spread values were subsequently reduced from Case 1 to Case 4, this leading to less scattered environments thus achieving higher correlation conditions. In the two first scenarios a richly scattered propagation leads to low correlation, and in the last case poorly scattered propagation leads to high correlation.

Results were obtained, in the particular case of $n_R=8$ and $n_T=2$, by employing the directional antenna system as shown in FIG. 9 and the architecture of the MIMO wireless transceiver with redundant antennas shown in FIG. 8.

Performance of these two 2×8 MIMO antenna systems were compared with that of a conventional 2×2 MIMO antenna system, with specific reference to a propagation scenario where the limiting factor is the interference generated by the other users (access point or clients), which were assumed to be uniformly distributed in the spatial domain (spatially white).

The results demonstrate that the enhancement in performance, expressed in terms of raw BER, is approximately 6 dB in the range of interest. This value is slightly reduced (to 5 dB) when the propagation conditions are such that the reduced angle spread leads to higher correlation of the received signals.

The results show an even higher gain in performance in the case of spatially colored interferers.

Without prejudice to the underlying principles of the invention, the details and the embodiments may vary, even appreciably, with reference to what has been described by way of example only, without departing from the scope of the invention as defined by the annexed claims.

The invention claimed is:

1. A method of receiving via a set of receive antennas a plurality of information flows, wherein the number of said received antennas is higher than the number of said information flows, comprising:
    deriving from at least a subset of said set of receive antennas respective RF signals;
    selecting among said RF signals different sets of selected RF signals;
    producing a plurality of receive signals as combinations of the selected RF signals in said different sets, having applied thereto relative RF phase shift weights, each said receive signal to be demodulated to recover one of said information flows in said plurality,
wherein said different sets of said selected RF signals each include a respective set of RF signals, whereby each said RF signal is included in only one of said different sets of RF signals.

2. The method of claim 1, comprising deriving respective RF signals from all of the receive antennas in said set.

3. The method of claim 1, comprising:
    generating for said RF signals at least one non-RF radio performance indicator respective of the quality of said RF signals; and
    generating said RF phase shift weights as a function of said at least one non-RF radio performance indicator.

4. The method of claim 3, wherein said at least one radio performance indicator is selected from: received signal strength indicator, packet error rate, signal to interference-plus-noise ratio, MAC throughput and employed transmission mode, and combinations thereof.

5. A system for receiving via a set of receive antennas, a plurality of information flows, wherein the number of said receive antennas is higher than the number of said information flows, comprising:
    a connection arrangement configured to derive from at least a subset of said set of receive antennas respective RF signals, and for selecting among said RF signals different sets of selected RF signals; and a processing arrangement including a RF combining network configured to produce a plurality of receive signals as combinations of the selected RF signals in said different sets, having applied thereto relative RF phase shift weights, each said receive signal to be demodulated to recover one of said information flows in said plurality, wherein said connection arrangement is configured for selecting said different sets of said selected RF signals to include each a respective set of RF signals, whereby each said RF signal is included in only one of said different sets of RF signals.

6. The system of claim 5, comprising said connection arrangement being configured to derive respective RF signals from all of the receive antennas in said set.

7. The system of claim 5, comprising a configuration configured to:
   generate for said RF signals at least one non-RF radio performance indicator representative of the quality of said RF signals; and
   generate said RF phase shift weights as a function of said at least one non-RF radio performance indicator.

8. The system of claim 7, wherein said at least one radio performance indicator is selected from: received signal strength indicator, packet error rate, signal to interference-plus-noise ratio, MAC throughput and employed transmission mode, and combinations thereof.

9. The system of claim 5, wherein said connection arrangement comprises inputs equal in number to the number of said receive antennas and said processing arrangement comprises outputs equal in number to said information flows.

10. The system of claim 5, wherein said processing arrangement comprises at least one RF delay line configured to apply a respective RF phase shift weight to one of said selected RF signals in said different sets.

11. The system of claim 10, wherein said processing arrangement comprises:
    at least two propagation paths for said respective one of said selected RF signals in said different sets, wherein at least one of said propagation paths comprises one said delay line; and
    associated switching elements configured to selectively direct said respective one of said selected RF signals to said at least two propagation paths.

12. The system of claim 11, wherein one of said at least two propagation paths is exempt from delay lines.

13. A wireless local area network device comprising a wireless communication system according to claim 5.

14. A high speed downlink packet access device comprising a wireless communication system according to claim 5.

* * * * *